United States Patent
Ichikawa et al.

(10) Patent No.: US 8,200,384 B2
(45) Date of Patent: Jun. 12, 2012

(54) ELECTRIC APPARATUS AND METHOD OF CONTROLLING THE SAME

(75) Inventors: Shinji Ichikawa, Toyota (JP); Naoto Suzuki, Fujinomiya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 449 days.

(21) Appl. No.: 12/450,624

(22) PCT Filed: Apr. 10, 2008

(86) PCT No.: PCT/JP2008/057463
§ 371 (c)(1),
(2), (4) Date: Oct. 2, 2009

(87) PCT Pub. No.: WO2008/133154
PCT Pub. Date: Nov. 6, 2008

(65) Prior Publication Data
US 2010/0114413 A1   May 6, 2010

(30) Foreign Application Priority Data

Apr. 25, 2007   (JP) ................................. 2007-115908

(51) Int. Cl.
| | |
|---|---|
| H02J 7/34 | (2006.01) |
| H02J 7/00 | (2006.01) |
| H02J 7/04 | (2006.01) |
| H02J 7/10 | (2006.01) |
| H01M 10/44 | (2006.01) |

(52) U.S. Cl. ........................................ 701/22; 108/65.8
(58) Field of Classification Search ........................ None
See application file for complete search history.

(56) References Cited

U.S. PATENT DOCUMENTS

2004/0019441 A1 *  1/2004  Larson ............................ 702/63
2007/0247003 A1 * 10/2007  Elder et al. .................... 307/10.1

FOREIGN PATENT DOCUMENTS

| JP | A-11-136875 | 5/1999 |
|---|---|---|
| JP | A-11-187577 | 7/1999 |
| JP | A-2001-185228 | 7/2001 |
| JP | A-2002-10502 | 1/2002 |
| JP | A-2002-313439 | 10/2002 |
| JP | A-2003-209969 | 7/2003 |
| JP | A-2004-56962 | 2/2004 |
| JP | A-2006-174535 | 6/2006 |
| JP | A-2006-307661 | 11/2006 |

OTHER PUBLICATIONS

Japanese Office Action issued Dec. 27, 2011 in Japanese Application No. 2007-115908 (with translation).
Japanese Office Action issued Feb. 15, 2011 in Japanese Application No. 2007-115908 (with translation).

* cited by examiner

*Primary Examiner* — Michael J. Zanelli
(74) *Attorney, Agent, or Firm* — Oliff & Berridge, PLC

(57) ABSTRACT

An input/output control unit receives two temperature values from first and second temperature sensors, respectively, and calculates a temperature difference that is an absolute value of a difference between the two temperature values. The input/output control unit stores a map determining a relationship between temperature values and target values of input powers (or output powers) of the first and second batteries required for keeping the temperature difference. Based on this map and the two temperature values received from the first and second temperature sensors, respectively, the input/output control unit determines the target values of the respective input powers (output powers) of the first and second batteries. A hybrid control unit controls an inverter unit and a booster converter such that the values of the powers input/output to or from the first and second batteries attain the target values, respectively.

4 Claims, 5 Drawing Sheets

ELECTRIC APPARATUS AND METHOD OF CONTROLLING THE SAME

TECHNICAL FIELD

The present invention relates to an electric apparatus and a method of controlling the same, and particularly to an electric apparatus that is mounted on a vehicle and includes a plurality of power storage devices as well as a method of controlling the electric apparatus.

BACKGROUND ART

In recent years, there have been vehicles such electric vehicles, hybrid vehicles and fuel-cell vehicles that employ an electric motor as a drive source for propelling the vehicle and is equipped with a battery of a large capacity storing an electric power for driving the electric motor.

Japanese Patent Laying-Open No. 2003-209969 has disclosed a power supply apparatus having a plurality of power supply stages connected, in parallel with each other, to an inverter. Each of the power supply stages includes a battery and a bidirectional boost/back converter. In this power supply apparatus, the bidirectional boost/back converter corresponding to each battery is controlled so that the batteries included in the respective power supply stages may be uniformly charged or discharged.

In the power supply apparatus disclosed in Japanese Patent Laying-Open No. 2003-209969, the charging and discharging of each battery can be controlled independently of the others. However, this power supply apparatus requires the plurality of converters and therefore is expensive.

For reducing the cost, it may be envisaged to connect the plurality of batteries to one converter. However, this structure may further complicate the control of the charging and discharging. Particularly, the control of the charging and discharging must be performed to reduce variations in temperature of the battery as far as possible because the internal resistance of the battery varies according to the temperature.

When there are variations in internal resistance between the plurality of batteries, a battery having a smaller internal resistance supplies or receives a larger power. Therefore, the temperature of this battery rises. For example, in the case where an internal resistance of a battery decreases with increase in its temperature, the variations in internal resistance further increase. Particularly, the possibility of occurrence of this tendency increases when an electric power is input or output to/from the battery at a high current rate (e.g., of about 10 C), where 1 C means a current value of the battery in the case where a theoretical battery capacity is charged or discharge in one hour.

Generally, when the battery temperature rises to a predetermined upper limit, the input/output power of the battery is restricted for protecting the battery. Therefore, even when the plurality of batteries are employed for obtaining the power supply of a large capacity, the power that can be practically input/output may become smaller than an assumed power. Accordingly, the charge/discharge must be controlled to reduce the variations in temperature between the plurality of batteries as far as possible.

DISCLOSURE OF THE INVENTION

An object of the invention is to provide an electric apparatus and a method of controlling the same that can suppress increase of variations in temperature between a plurality of batteries.

In summary, the invention provides an electric apparatus for mounting on a vehicle. The electric apparatus includes first and second power storage devices each being capable of being charged and discharged; a power line connected to the first and second power storage devices arranged in parallel; an input/output unit for performing input/output of an electric power with respect to the power line; a first temperature sensing unit for sensing a temperature of the first power storage device; a second temperature sensing unit for sensing a temperature of the second power storage device; a target value setting unit; and a control unit. The target value setting unit sets a target value of the electric power based on the temperatures of the first and second power storage devices sensed by the first and second temperature sensing units, respectively, as well as a temperature difference between the first and second power storage devices. The control unit controls the input/output unit to attain the target value of the electric power.

Preferably, the target value setting unit sets the target value to keep the temperature difference of a predetermined value or less between the first and second power storage devices.

More preferably, the target value includes a first target value of the electric power input/output to or from the first power storage device, and a second target value of the electric power input/output to or from the second power storage device. The target value setting unit prestores a map defining the first and second target values corresponding to the temperatures of the first and second power storage devices, respectively, to keep the temperature difference of the predetermined value or less between the first and second power storage devices. The target value setting unit sets the first and second target values based on the map, the sensed temperatures of the first and second power storage devices, and the temperature difference between the first and second power storage devices.

Further preferably, the map determines a rate of change of the first target value with respect to the temperature of the first power storage device to decrease with increase in temperature of the first power storage device. The map determines a rate of change of the second target value with respect to the temperature of the second power storage device to decrease with increase in temperature of the second power storage device.

According to another aspect, the invention provides a control method of an electric apparatus for mounting on a vehicle. The electric apparatus includes first and second power storage devices each being capable of being charged and discharged, a power line connected to the first and second power storage devices arranged in parallel, and an input/output unit for performing input/output of an electric power with respect to the power line. The control method includes the steps of sensing a temperature of the first power storage device and a temperature of the second power storage device; setting a target value of the electric power based on the sensed temperatures of the first and second power storage devices as well as a temperature difference between the first and second power storage devices; and controlling the input/output unit to attain the target value of the electric power.

Preferably, the step of setting the target value sets the target value to keep the temperature difference of a predetermined value or less between the first and second power storage devices.

Further preferably, the target value includes a first target value of the electric power input/output to or from the first power storage device, and a second target value of the electric power input/output to or from the second power storage device. The step of setting the target value sets the first and second target values based on a map defining the first and second target values corresponding to the temperatures of the first and second power storage devices, respectively, the sensed temperatures of the first and second power storage devices, and the temperature difference between the first and second power storage devices to keep the temperature difference of the predetermined value or less between the first and second power storage devices.

Further preferably, the map determines a rate of change of the first target value with respect to the temperature of the first power storage device to decrease with increase in temperature of the first power storage device. The map determines a rate of change of the second target value with respect to the temperature of the second power storage device to decrease with increase in temperature of the second power storage device.

Accordingly, the invention can suppress the increase of variations of the temperatures between the plurality of batteries.

BEST MODES FOR CARRYING OUT THE INVENTION

Embodiments of the invention will now be described with reference to the drawings. In the following description, the same or corresponding portions bear the same reference numbers, and description thereof is not repeated.

Figure 1:
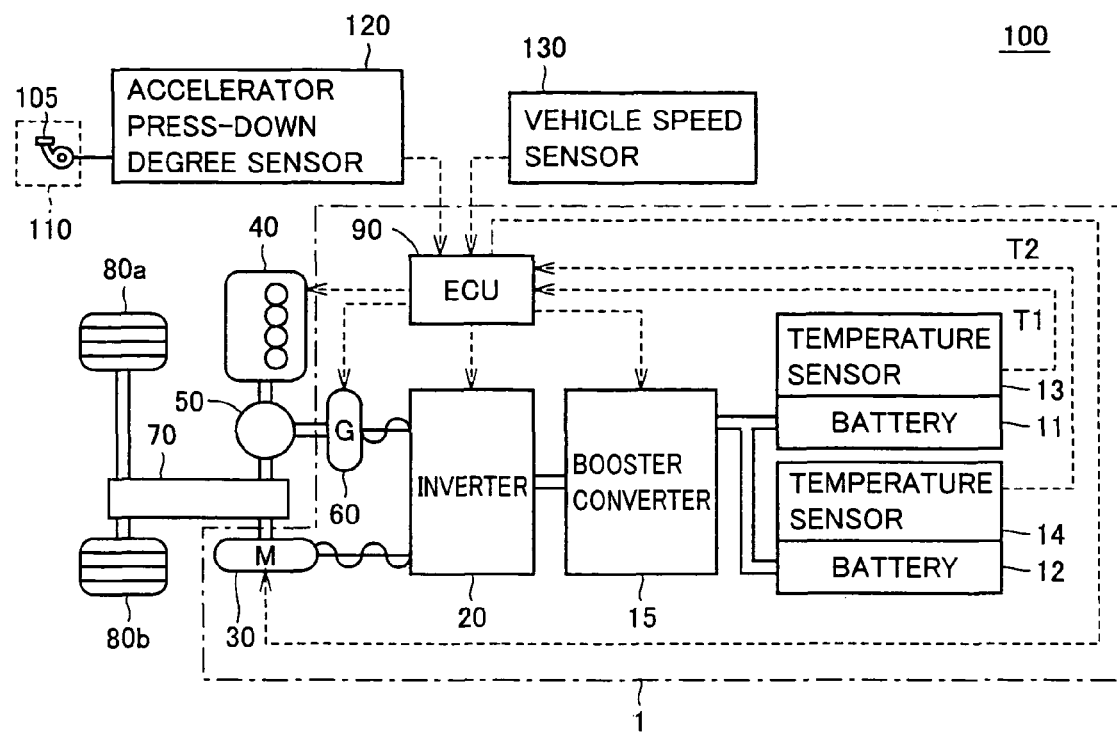
FIG. 1 shows a major structure of a hybrid vehicle 100 provided with an electric apparatus of an embodiment.

FIG. 1 shows a major structure of a hybrid vehicle 100 provided with an electric apparatus of an embodiment. Referring to FIG. 1, hybrid vehicle 100 includes an electric apparatus 1. Electric apparatus 1 includes batteries 11 and 12, temperature sensors 13 and 14, a booster converter 15, an inverter unit 20, an electric motor 30, a generator 60 and an ECU (Electronic Control Unit) 90. Hybrid vehicle 100 further includes an engine 40, a power splitting mechanism 50, a speed reducer 70, drive wheels 80a and 80b, an accelerator pedal device 110, an accelerator press-down degree sensor 120 and a vehicle speed sensor 130.

Batteries 11 and 12 are chargeable and dischargeable power storage devices. Batteries 11 and 12 are formed of, e.g., secondary batteries of nickel hydrogen, lithium ions or the like, and are connected, in parallel with each other, to booster converter 15. A capacitor may be used as the power storage device in place of the secondary battery.

Temperature sensor 13 senses a temperature of battery 11 to provide a temperature value T1 to ECU 90. Temperature sensor 14 senses a temperature of battery 12 to provide a temperature value T2 to ECU 90.

Booster converter 15 boosts a DC voltage received from batteries 11 and 12, and provides the boosted DC voltage to inverter unit 20. Inverter unit 20 converts the DC voltage supplied form batteries 11 and 12 to an AC voltage for driving motor 30. The voltage levels of batteries 11 and 12 may be equal to an input voltage level of inverter unit 20. In this case, booster converter 15 may be eliminated by connecting batteries 11 and 12, in parallel with each other, to inverter unit 20.

Inverter unit 20 is capable of bidirectional power conversion, and converts a power (AC voltage) generated by a regenerative braking operation of motor 30 and a power (AC voltage) generated by generator 60 to DC voltages, respectively. Booster converter 15 converts the DC voltage supplied from inverter unit 20 to a voltage appropriate for charging batteries 11 and 12 so that batteries 11 and 12 are charged.

Engine 40 is an internal combustion engine using gasoline or the like as a fuel, and converting thermal energy obtained by burning the fuel to a kinetic energy providing a drive power for outputting it. Power splitting mechanism 50 can split the output of engine 40 into a power transmitted through speed reducer 70 to drive wheels 80a and 80b, and a power transmitted to generator 60. Generator 60 is rotated by the output of engine 40 transmitted through power splitting mechanism 50, and thereby generates an electric power. Booster converter 15 and inverter unit 20 use the power generated by generator 60 as the power for charging batteries 11 and 12 or the electric drive power of motor 30.

Motor 30 is driven to rotate by the AC voltage supplied from inverter unit 20, and the output thereof is transmitted through speed reducer 70 to drive wheels 80a and 80b. In the regenerative braking operation, i.e., when motor 30 is rotated according to the deceleration of drive wheels 80a and 80b, motor 30 operates as a power generator.

Accelerator pedal device 110 sets an accelerator press-down degree according to a depressing force on an accelerator pedal 105 applied by a driver. Accelerator press-down degree sensor 120 is connected to an accelerator pedal device 110, and provides an output voltage corresponding to the accelerator press-down degree to ECU 90.

Vehicle speed sensor 130 senses the vehicle speed from the revolution speed of drive wheels 80a and 80b, and provides a result of the sensing to ECU 90.

When hybrid vehicle 100 is in a low-load state such as a starting state, low-speed running state or slow-hill descending state, it does not use the output of engine 40 for avoiding a region of low engine efficiency, and runs using only the output of motor 30. Thus, in a region of a small accelerator press-down degree, hybrid vehicle 100 runs using only the output of motor 30. In this case, engine 40 stops except for the case where a warm-up is required. When the warm-up is required, engine 40 idles.

When the accelerator press-down degree is larger than a predetermined value and thus the ordinary running is performed, engine 40 starts, and power splitting mechanism 50 splits the output of engine 40 into a drive power for drive wheels 80a and 80b, and a drive power for power generation by generator 60. The electric power generated by generator 60 is used for driving motor 30. During the ordinary running, therefore, motor 30 assists engine 40 in driving drive wheels 80a and 80b. ECU 90 controls the power splitting rate of power splitting mechanism 50 to attain the highest efficiency as a whole.

Further, during rapid acceleration, the electric powers supplied from batteries 11 and 12 are further used for driving motor 30 so that the driving power of drive wheels 80a and 80b further increases.

During the deceleration or braking, motor 30 is driven to rotate by drive wheels 80a and 80b and thereby generates the electric power. The electric power collected by the regenerative generation of motor 30 is converted into the DC voltage by inverter unit 20, and is used for charging batteries 11 and 12. When the vehicle stops, engine 40 automatically stops.

In hybrid vehicle 100, as described above, the output of engine 40 and the output of motor 30 using electric energy as its source are combined with each other and, more specifically, the driving of engine 40 and motor 30 is controlled according to the state of the vehicle so that the vehicle driving with improved fuel consumption is performed.

Figure 2:
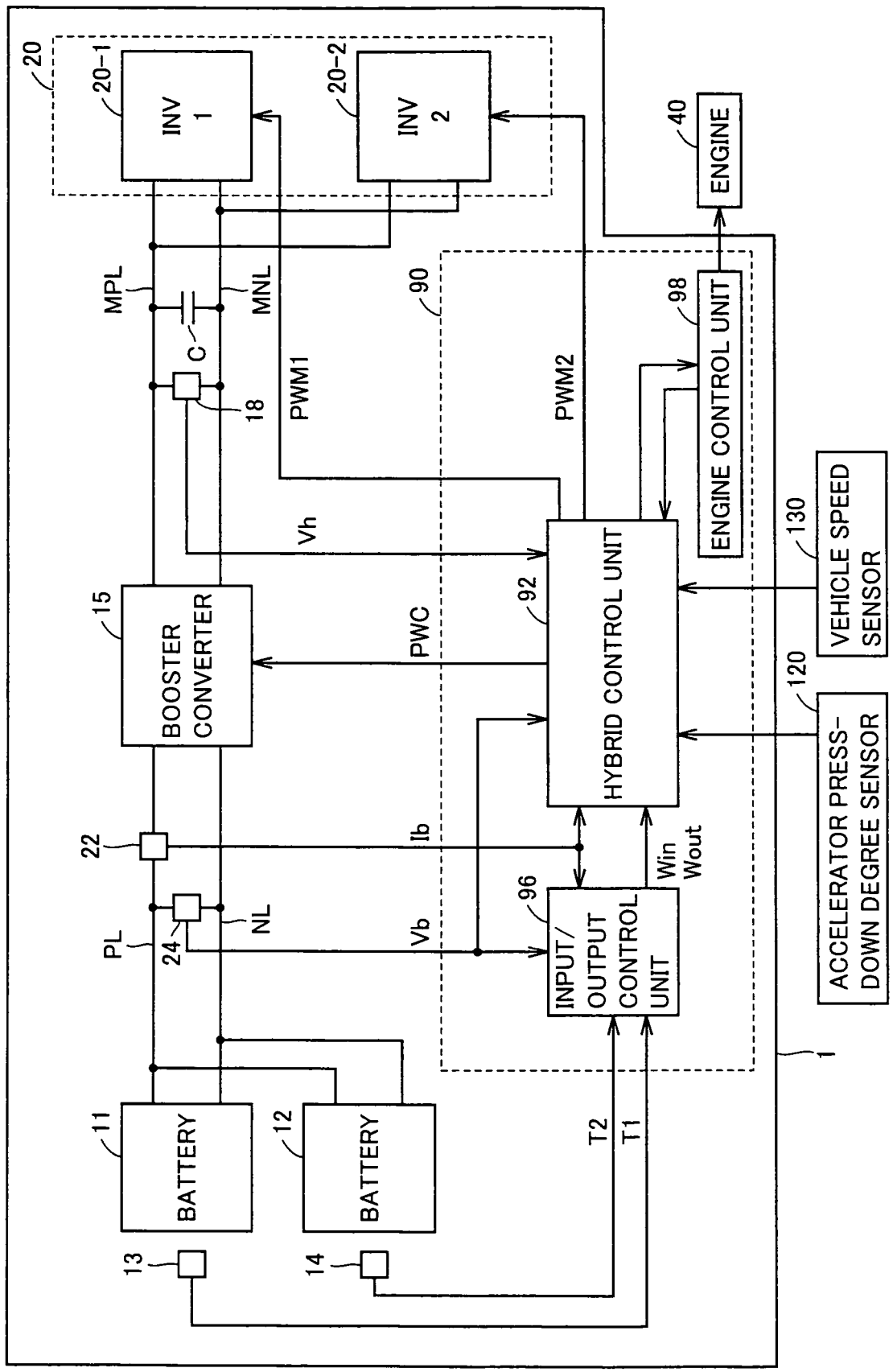
FIG. 2 illustrates more specifically a structure of an electric apparatus 1 in FIG. 1.

FIG. 2 illustrates more specifically a structure of electric apparatus 1 in FIG. 1. Referring to FIG. 2, each of batteries 11 and 12 is connected to positive and negative lines PL and NL.

Booster converter 15 converts the voltage between positive and negative lines PL and NL (i.e., the DC voltage applied from batteries 11 and 12) according to a drive signal PWC, and provides it to inverter unit 20.

Inverter unit 20 includes inverters 20-1 and 20-2 that are connected, in parallel with each other, to a main positive bus line MPL and a main negative bus line MNL. Each of inverters 20-1 and 20-2 is formed of, e.g., a bridge circuit including switching elements for three phases.

Inverter 20-1 performs the switching operation according to a drive signal PWM1 to convert the DC power supplied from booster converter 15 to the AC power, and provides it to generator 60 (see FIG. 1). Thereby, generator 60 is driven. Inverter 20-1 performs the switching operation according to drive signal PWM1 to convert the AC power generated by generator 60 to the DC power, and provides it to booster converter 15.

Inverter 20-2 performs substantially the same operation as inverter 20-1 according to a drive signal PWM2. Thus, inverter 20-2 drives motor 30 (see FIG. 1) according to drive signal PWM2, and also converts the AC power generated by motor 30 to the DC power for providing it to booster converter 15.

Booster converter 15 converts the AC power supplied from inverters 20-1 and 20-2 to the DC power, and provides it to batteries 11 and 12. Batteries 11 and 12 receive the DC power from booster converter 15 via main positive bus line MPL and main negative bus line MNL. Thereby, batteries 11 and 12 are charged.

A smoothing capacitor C is connected between main positive bus line MPL and main negative bus line MNL, and reduces power variation components contained in main positive bus line MPL and main negative bus line MNL.

Temperature sensor 13 senses the internal temperature of battery 11, and provides temperature value T1. Temperature sensor 14 senses the internal temperature of battery 12, and provides temperature value T2. A voltage sensor 18 senses a voltage value Vh between main positive bus line MPL and main negative bus line MNL. A current sensor 22 senses a current value Ib (a value of the current input/output to or from batteries 11 and 12) of the current flowing through positive line PL. A voltage sensor 24 senses a voltage value Vb (a voltage value of batteries 11 and 12) between positive and negative lines PL and NL.

ECU 90 includes an input/output control unit 96, a hybrid control unit 92 and an engine control unit 98.

Input/output control unit 96 receives a result of sensed current Ib from current sensor 22, and receives a result of sensed voltage Vb from voltage sensor 24. Further, input/output control unit 96 receives temperature values T1 and T2 from respective temperature sensors 13 and 14, calculates a temperature difference $\Delta T$ that is an absolute value of a difference between temperature values T1 and T2. Input/output control unit 96 stores a map that determines a relationship of target values of the input powers (or output powers) of batteries 11 and 12 required for keeping temperature difference $\Delta T$ with respect to the temperature values. Based on this map as well as temperature values T1 and T2 received from respective temperature sensors 13 and 14, input/output control unit 96 determines the target values of the input powers (or output powers) of batteries 11 and 12, respectively.

In the charging operation of batteries 11 and 12, input/output control unit 96 calculates an input target value Win by summing the target values of input powers of batteries 11 and 12 calculated based on temperature values T1 and T2, temperature difference $\Delta T$ and the map. In the discharging operation of batteries 11 and 12, input/output control unit 96 calculates an output target value Wout by summing the target values of output powers of batteries 11 and 12 calculated based on temperature values T1 and T2, temperature difference $\Delta T$ and the map. Input/output control unit 96 provides input and output target values Win and Wout to hybrid control unit 92.

Engine control unit 98 performs throttle control of engine 40, and senses the engine revolution speed of engine 40 to provide a sensed speed to hybrid control unit 92.

Hybrid control unit 92 receives output signals of various sensors (not shown), a signal indicating the vehicle speed provided from vehicle speed sensor 130, a signal indicating the accelerator press-down degree provided from accelerator press-down degree sensor 120, and calculates the power (total power) required for driving the vehicle. Hybrid control unit 92 further receives input and output target values Win and Wout from input/output control unit 96.

Based on the total power and output target value Wout (or input target value Win), hybrid control unit 92 determines which one of EV running and HV running is to be performed by hybrid vehicle 100. In the EV running, the vehicle uses only the drive power of motor 30 for the running. In the HV running, the vehicle uses both engine 40 and motor 30 for the running.

When hybrid vehicle 100 performs the HV running, hybrid control unit 92 calculates the required revolution speed and the required power of the engine. Hybrid control unit 92 provides the required revolution speed and the required power to engine control unit 98 for performing the throttle control of engine 40 by engine control unit 98.

Hybrid control unit 92 calculates a difference power by subtracting the engine-required power from the total power, and calculates the torque target value and the revolution speed target value of each of generator 60 and motor 30 based on the calculated difference power and output target value Wout (or input target value Win).

Hybrid control unit 92 receives a sensing result of current Ib from current sensor 22, and also receives sensing results of voltages Vh and Vb from voltage sensors 18 and 24, respectively. Hybrid control unit 92 controls inverter 20-1 by producing drive signal PWM1 so that the generated torque and revolution speed of generator 60 may attain the torque target value and the revolution speed target value. Likewise, hybrid control unit 92 controls inverter 20-2 by producing drive signal PWM2 so that the generated torque and revolution speed of motor 30 may attain the torque target value and the revolution speed target value. Further, hybrid control unit 92 produces drive signal PWC based on the torque target value and revolution speed target value of each of generator 60 and motor 30, and provides it to booster converter 15.

Hybrid control unit 92 controls inverter unit 20 and booster converter 15 (and engine 40 when necessary) as described above, and thereby the power provided to batteries 11 and 12 as well as the power provided from batteries 11 and 12 are controlled to attain input target value Win and output target value Wout, respectively.

When variations occur in internal resistance between batteries 11 and 12, the power input/output to or from the battery of a smaller internal resistance increases. Thereby, a temperature difference between batteries 11 and 12 increases. In many cases, the internal resistance of the battery decreases with increase in temperature. For example, when battery 11 has a smaller internal resistance than battery 12, the power is preferentially input/output to or from battery 11. Therefore, the temperature of battery 11 rises more largely than that of battery 12.

Particularly, when the power is input/output to or from the battery at a high current rate (e.g., of about 10 C), the temperature of battery 11 reaches a predetermined upper limit in a short time. In this case, the input/output power of battery 11 is restricted for protecting battery 11. However, batteries 11 and 12 are connected, in parallel with each other, to booster converter 15 so that the charge/discharge of each of batteries 11 and 12 cannot be controlled independently of the other. Therefore, when the input/output power of battery 11 is restricted, a total of the powers input/output to or from respective batteries 11 and 12 decreases.

In this embodiment, input/output control unit 96 determines input and output target values Win and Wout based on temperature values T1 and T2 to suppress the increase in temperature difference ΔT. Thereby, the large powers can be input/output to both batteries 11 and 12. Thus, the embodiment can sufficiently bring out the performance of the batteries, and therefore can implement the power supply of a large capacity.

The input/output control of the embodiment will be described below in detail.

When a power consumption of battery 11 is larger than that of battery 12, the temperature of battery 11 rises more rapidly. This reduces the internal resistance of battery 11. When the total of the power consumptions of batteries 11 and 12 is kept constant, the decrease of the internal resistance of battery 11 increases the power input/output to or from battery 11, and decreases the power input/output to or from battery 12. Thereby, the temperature difference between batteries 11 and 12 increases.

The embodiment restricts the total of the powers of batteries 11 and 12 so that temperature difference ΔT may keep a predetermined value (e.g., of 5° C.) or lower. This suppresses the temperature rising of batteries 11 and 12. Particularly, the embodiment suppresses the temperature rising of the battery (e.g., battery 11) of which temperature tends to rise more rapidly (i.e., battery having the smaller internal resistance) so that the increase in temperature difference ΔT can be suppressed.

Figure 3:
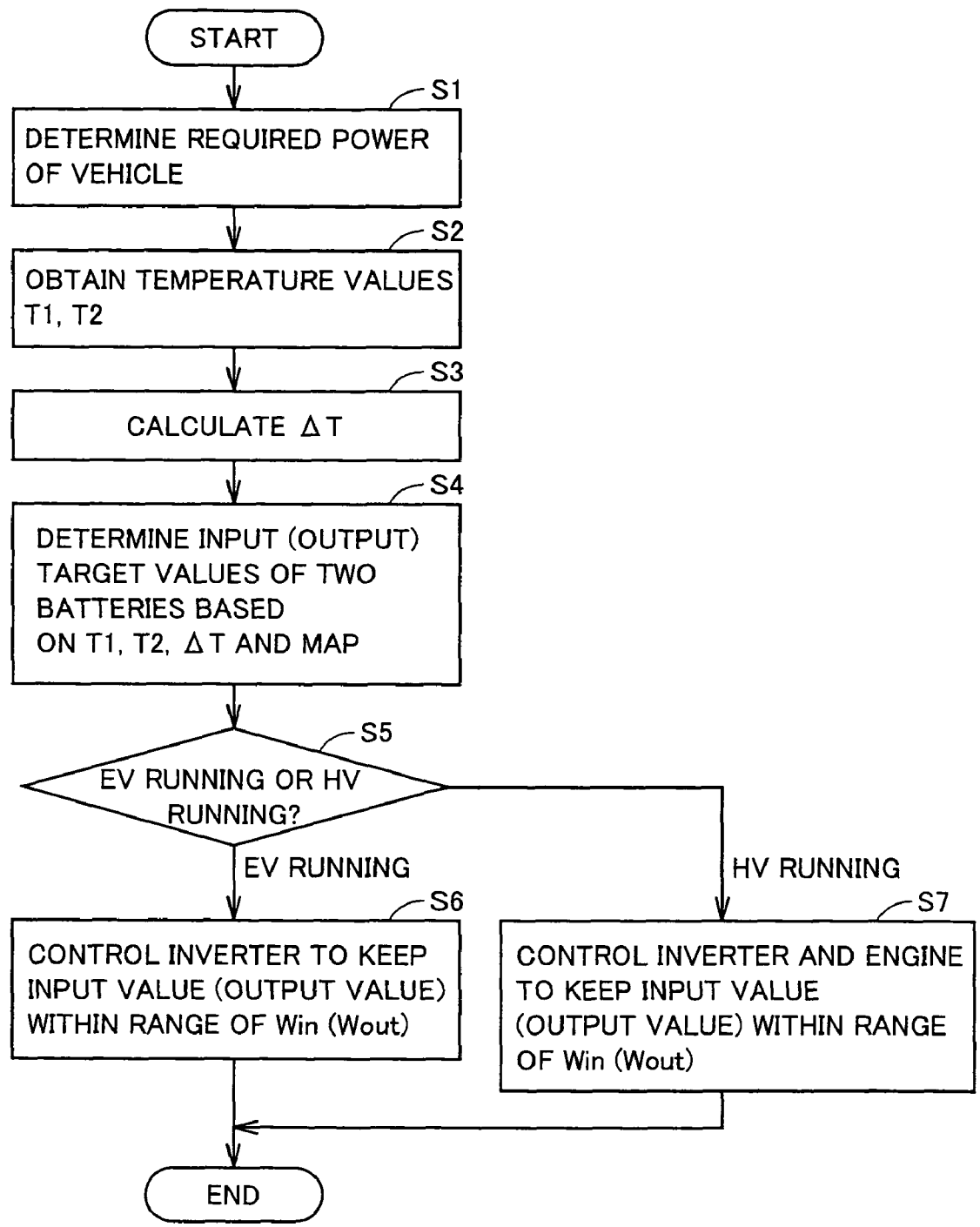
FIG. 3 is a flowchart illustrating processing executed by an ECU 90.

FIG. 3 is a flowchart illustrating the processing executed by ECU 90. Referring to FIGS. 3 and 2, hybrid control unit 92 determines the required power, i.e., the total power of the vehicle based on the accelerator press-down degree, vehicle speed and the like (step S1). Then, input/output control unit 96 obtains temperature values T1 and T2 from temperature sensors 13 and 14, respectively, (step S2) and calculates temperature difference ΔT (absolute value of the difference between temperature values T1 and T2).

In a step S4, when batteries 11 and 12 are discharged, input/output control unit 96 determines output target values (first and second output target values) of respective batteries 11 and 12 based on temperature values T1 and T2, temperature difference ΔT and the map. In step S4, when batteries 11 and 12 are charged, input/output control unit 96 likewise determines input target values (first and second input target values) of respective batteries 11 and 12 based on temperature values T1 and T2, temperature difference ΔT and the map.

Figure 4:
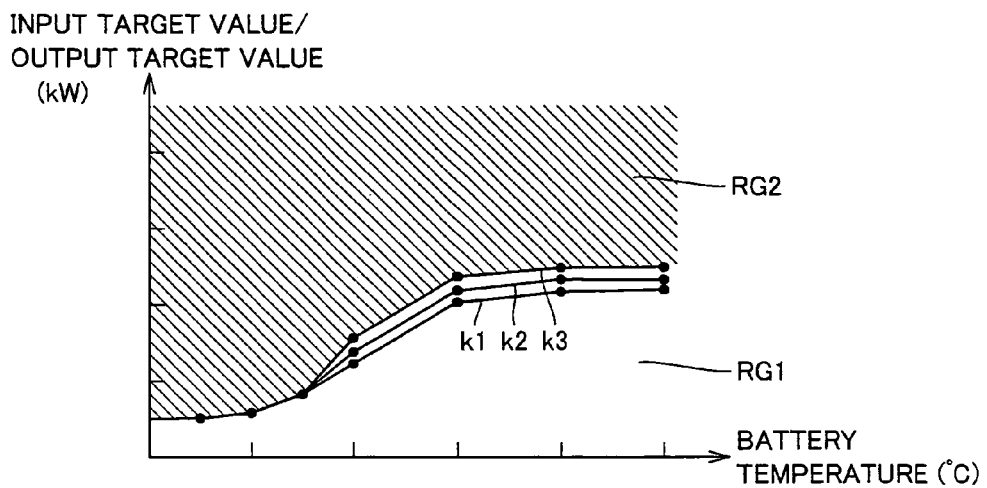
FIG. 4 shows a map to which an input/output control unit 96 refers in processing of a step S4 in FIG. 3.

FIG. 4 shows a map to which input/output control unit 96 refers in the processing of step S4 in FIG. 3. For example, input/output control unit 96 internally stores this map.

Referring to FIG. 4, the ordinate of the graph indicates the input and output target values (in units of kW), and the abscissa gives the battery temperature (in units of ° C.). Solid lines k1, k2 and k3 represent relationships between the battery temperature and the input/output power exhibited when temperature difference ΔT is 5° C., 10° C. and 15° C., respectively. For example, when the target value of the input/output power is determined according to the relationship represented by solid line k1, the region on the map is divided along solid line k1 into regions RG1 and RG2. In region RG1, temperature difference ΔT between batteries 11 and 12 can be kept at or below a predetermined value, e.g., of 5° C. or lower. In region RG2, temperature difference ΔT between batteries 11 and 12 cannot be kept at a predetermined value, e.g., of 5° C. or lower. When the target value of the input/output power is determined according to the relationship represented by solid line k2 (or k3), the region on the map is likewise divided along solid line k2 (or solid line k3) into regions RG1 and RG2.

Each of solid lines k1, k2 and k3 represents that the temperature changing rate of the target value of the input/output power decreases with increase in battery temperature. When the battery temperature increases, the internal resistance decreases so that the input/output power tends to increase. Therefore, the battery temperature is likely to rise. By suppressing the change in target value of the input/output power to a higher extent as the battery temperature rises, further rising of the battery temperature can be suppressed.

Based on temperature T1 and temperature difference ΔT, input/output control unit 96 determines the input value (or output value) of battery 11 to exhibit temperature difference ΔT equal to 5° C. or lower. For example, input/output control unit 96 calculates the target value of the input/output power corresponding to temperature T1 from the relationship between the battery temperature and the input/output power exhibited by solid line k1. Input/output control unit 96 determines, as the first input target value (or first output target value) of battery 11, a value obtained by multiplying a result of the above calculation by an appropriate coefficient (e.g., of 0.9).

Input/output control unit 96 determines a second input target value (or second output target value) of battery 12 based on temperature T2, temperature difference ΔT and the map by the method similar to that of calculating the first input target value (or first output target value).

Input/output control unit 96 calculates input target value Win (or output target value Wout) by summing the first and second input target values (or first and second output target values).

In the embodiment, the map of FIG. 4 is commonly used for batteries 11 and 12, but two maps corresponding to batteries 11 and 12, respectively, may be used.

Returning to FIG. 3, hybrid control unit 92 determines based on the required power of the vehicle and output target value Wout (or input target value Win) which one of the EV running and the HV running to perform for hybrid vehicle 100 (step S5). For example, hybrid control unit 92 determines which one of the EV running and the HV running to perform for hybrid vehicle 100, based on the difference between the total power and output target value Wout (or input target value Win). For example, when this difference falls within a predetermine range, hybrid control unit 92 selects the EV running for hybrid vehicle 100. Otherwise, hybrid control unit 92 selects the HV running for hybrid vehicle 100.

In the EV running, hybrid control unit 92 controls inverters 20-1 and 20-2 as well as booster converter 15 (step S6). In the HV running, hybrid control unit 92 controls inverters 20-1 and 20-2 as well as booster converter 15, and further causes engine control unit 98 to control engine 40 (step S7). The processing in steps S6 and S7 controls the input powers (or output powers) of batteries 11 and 12 to fall within the range of input target value Win (or output target value Wout).

(Modification)

Figure 5:
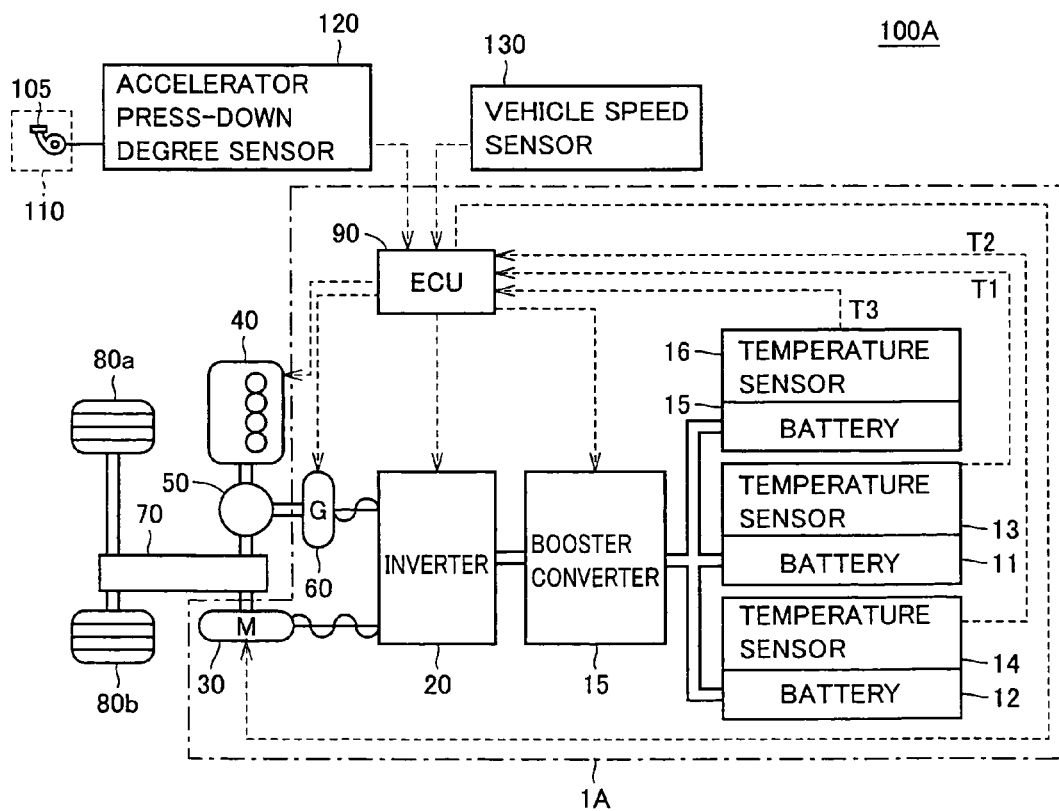
FIG. 5 shows a modification of the electric apparatus of the embodiment.

FIG. 5 shows a modification of the electric apparatus of the embodiment. Referring to FIGS. 5 and 1, a hybrid vehicle 100A differs from hybrid vehicle 100 in that it employs an electric apparatus 1A instead of electric apparatus 1. Electric apparatus 1A differs from electric apparatus 1 in that it further includes a battery 16 connected to booster converter 15 as well as a temperature sensor 17 sensing the temperature of battery 16 and providing a temperature value T3 to ECU 90. A structure of ECU 90 shown in FIG. 5 is substantially the same as that shown in FIG. 2, and therefore description thereof is not repeated. Accordingly, FIG. 2 is appropriately referred to in the following description of the modification.

Figure 6:
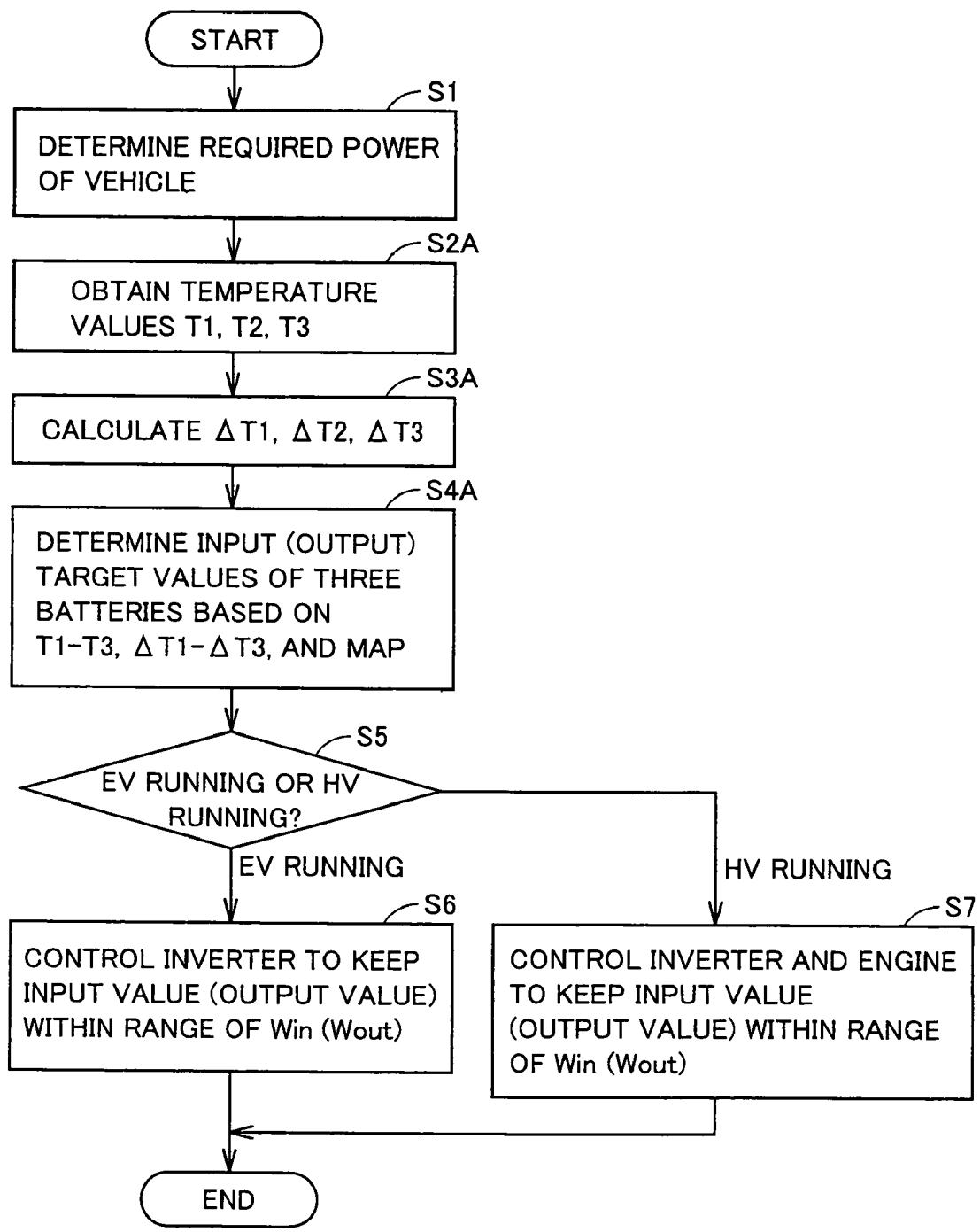
FIG. 6 is a flowchart illustrating processing executed by ECU 90 in FIG. 5.

FIG. 6 is a flowchart illustrating processing executed by ECU 90 in FIG. 5. Referring to FIGS. 6 and 2, hybrid control unit 92 calculates the required power of the vehicle based on the accelerator press-down degree, vehicle speed and the like (step S1). Input/output control unit 96 receives temperature values T1, T2 and T3 from temperature sensors 13, 14 and 17, respectively (step S2A). Input/output control unit 96 calculates a temperature difference ΔT1 that is an absolute value of the difference between temperature values T1 and T2, a temperature difference ΔT2 that is an absolute value of the difference between temperature values T2 and T3, and a temperature difference ΔT3 that is an absolute value of the difference between temperature values T3 and T1 (step S3A).

Input/output control unit 96 calculates the input target values (or output target values) of respective batteries 11, 12 and 16 based on temperature values T1, T2 and T3, temperature differences ΔT1, ΔT2 and ΔT3, and the map shown in FIG. 4. Input/output control unit 96 sums the input target values (or output target values) of the respective batteries to determine input target value Win (or output target value Wout) (step S4A). The processing in and after step S5 is substantially the same as that in and after step S5 in FIG. 3, and therefore description thereof is not repeated. When the vehicle employs the three batteries described above or more batteries, the embodiment can control the input/output powers to prevent increase in temperature difference between the plurality of batteries.

According to the embodiment, when the powers are input/output to or from the plurality of batteries at a high current rate (e.g., of 10 C), it is possible to prevent remarkable rising of the temperature of only a specific battery. Thereby, the input/output power of this specific battery is restricted so that it is possible to prevent the decrease of the total input/output power of the plurality of batteries. Accordingly, the embodiment can implement the electric apparatus equipped with the power supply of a large capacity.

Positive and negative lines PL and NL form the "electric lines" in the invention, and booster converter 15 and inverter unit 20 form the "input/output unit" in the invention.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. An electric apparatus for mounting on a vehicle, comprising:
    first and second power storage devices each being capable of being charged and discharged;
    a power line connected to said first and second power storage devices arranged in parallel;
    an input/output unit for performing input/output of an electric power with respect to said power line;
    a first temperature sensing unit for sensing a temperature of said first power storage device as a first temperature;
    a second temperature sensing unit for sensing a temperature of said second power storage device as a second temperature;
    a target value setting unit for setting a target value of said electric power based on said first and second temperatures sensed by said first and second temperature sensing units, respectively, as well as a temperature difference between said first and second temperatures; and
    a control unit for controlling said input/output unit to attain said target value of said electric power, wherein
    said target value setting unit sets said target value to keep said temperature difference at a predetermined value or less by changing a temperature change rate of said target value according to said first and second temperatures.

2. The electric apparatus according to claim 1, wherein said target value includes:
    a first target value of the electric power input/output to or from said first power storage device, and
    a second target value of the electric power input/output to or from said second power storage device; and
    said target value setting unit prestores a map defining said first and second target values corresponding to said first and second temperatures, respectively, to keep said temperature difference at said predetermined value, and sets said first and second target values based on said map, said first and second temperatures sensed by said first and second temperature sensing units, respectively, and said temperature difference.

3. The electric apparatus according to claim 2, wherein
    a rate of change of said first target value with respect to said first temperature decreases with increase in said first temperature, and
    a rate of change of said second target value with respect to said second temperature decreases with increase in said second temperature.

4. A control method of an electric apparatus for mounting on a vehicle, said electric apparatus including first and second power storage devices each being capable of being charged and discharged, a power line connected to said first and second power storage devices arranged in parallel, and an input/output unit for performing input/output of an electric power with respect to said power line, said control method comprising the steps of:
    sensing a temperature of said first power storage device as a first temperature and a temperature of said second power storage device as a second temperature;
    setting a target value of said electric power based on said first and second temperatures as well as a temperature difference between said first and second temperatures; and
    controlling said input/output unit to attain said target value of said electric power, wherein
    said step of setting said target value sets said target value to keep said temperature difference at a predetermined value or less by changing a temperature change rate of said target value according to said first and second temperatures.

* * * * *